Figure 1:
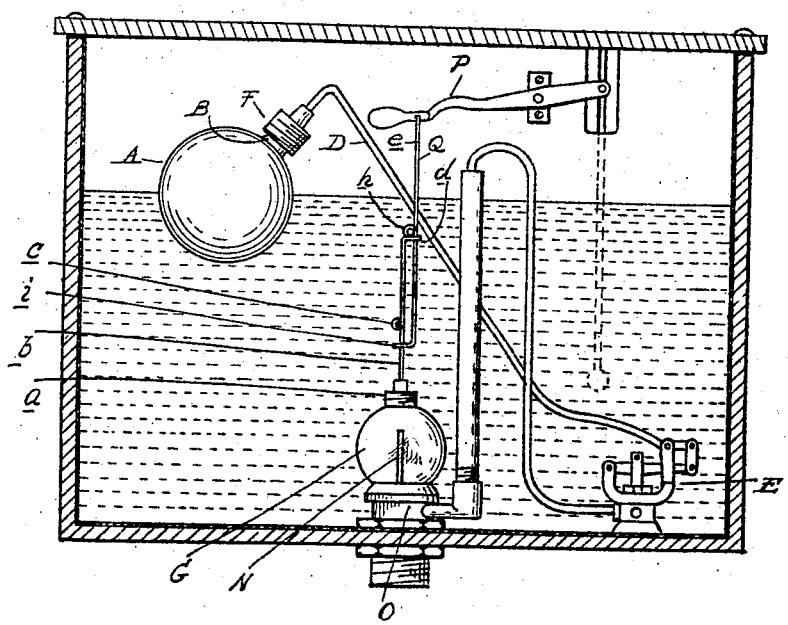

No. 868,088. PATENTED OCT. 15, 1907.
W. HEAP.
FLOAT FOR FLUSHING TANKS.
APPLICATION FILED FEB. 21, 1906.

2 SHEETS—SHEET 1.

Witnesses
Edward Ault
Geo. W. Graves

Inventor
William Heap
By Whittemore Hulbert & Whittemore
attys.

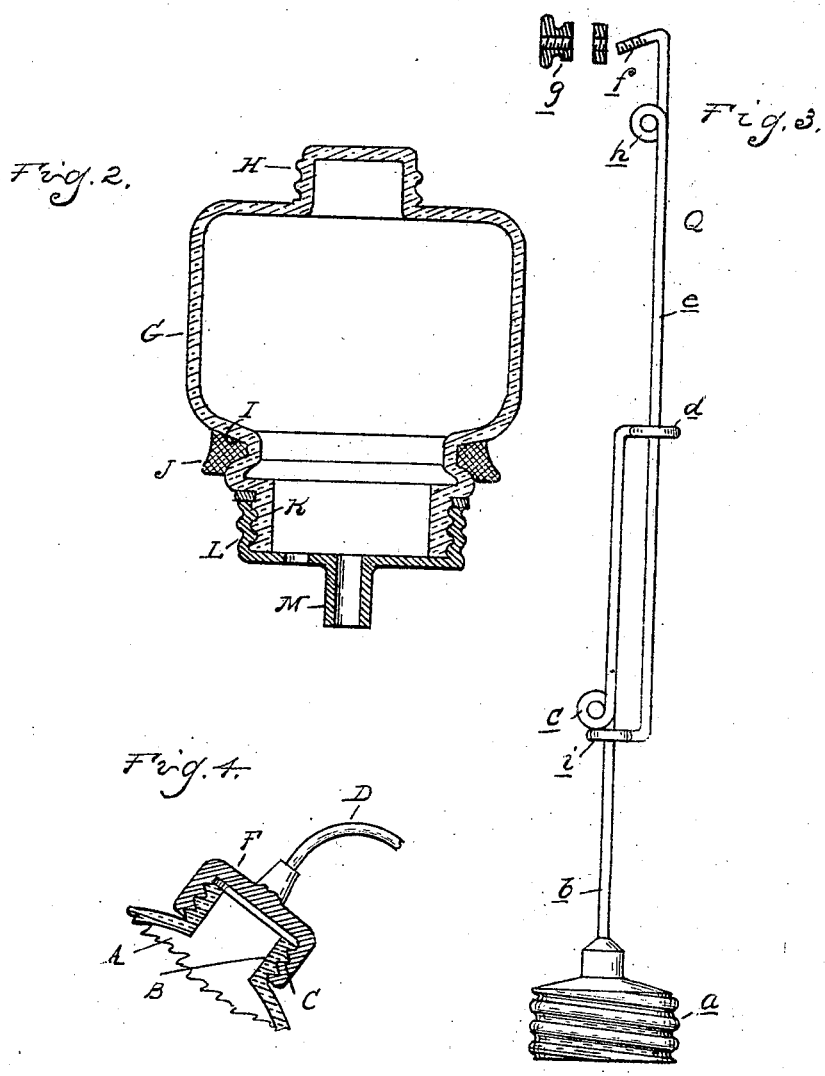

# UNITED STATES PATENT OFFICE.

WILLIAM HEAP, OF MUSKEGON, MICHIGAN.

FLOAT FOR FLUSHING-TANKS.

No. 868,088.  Specification of Letters Patent.  Patented Oct. 15, 1907.

Application filed February 21, 1906. Serial No. 302,160½.

*To all whom it may concern:*

Be it known that I, WILLIAM HEAP, a citizen of the United States of America, residing at Muskegon, in the county of Muskegon and State of Michigan, have invented certain new and useful Improvements in Floats for Flushing-Tanks, of which the following is a specification, reference being had therein to the accompanying drawings.

The invention relates to floats more particularly designed for use in connection with flushing tanks, and the invention consists in the novel construction of the float: further in the construction and arrangement of the same in connection with the valves of a flushing tank, as hereinafter set forth.

In the drawings, Figure 1 is a vertical section through a flushing tank, the valves of which are provided with my improved construction of float; Fig. 2 is a cross section through the float valve controlling the outlet; Fig. 3 is an elevation of the operating connection for this valve; and Fig. 4 is a section through the connection to the float controlling the water inlet valve.

In the present state of the art, floats for controlling the valves of a flushing tank and for similar uses, are generally formed of sheet metal having soldered joints. In many places where these floats are used, the water contains impurities, causing the rapid corrosion of the metal or the setting-up of galvanic action between the metal of the float and the solder, resulting in rapid deterioration; eventually, the float becomes pervious to water and fills, rendering the same useless.

It is one of the objects of the present invention to form the float of a material which is impervious to water and will not be affected chemically by any of the impurities contained therein. It is a further object to provide connections between the float and valve in which solder is not employed. These objects I preferably attain by forming the float of glass and providing it with an integral nipple, to which the operating connection may be attached without the use of solder.

As shown in Fig. 1, A is the float for controlling the water inlet valve. This is preferably of spherical form, which may be blown or otherwise fashioned and which is provided with a neck or nipple B having external screw-threads C formed thereon. D is the rod connecting the float to the inlet valve E. The end of this rod is provided with a cap F, which is threaded correspondingly to the nipple B and adapted to be engaged therewith. Thus the float may be quickly attached or removed from its connection.

The valve controlling the outlet is of the usual type of float valves designed for this purpose and has a bell-shaped float G formed of glass. This float is also provided with an integral threaded nipple H, which is arranged at the upper end thereof and is closed to prevent passage of water into the float. The lower portion of the bell is provided with an annular groove I, in which a suitable gasket J is placed for forming the valve face, and below this is a contracted portion K of the bell which is also threaded to engage the guide cap L. This guide cap is formed of metal and is provided with a sleeve M which fits over a central guide post N, projecting upward from the fitting O forming the valve seat. This valve is operated in the usual way by lifting from its seat, as by an operating lever P and connecting link Q, after which the float will hold the valve open until the tank is empty. The bell G is guided in its movement by the sleeve M which loosely engages the post N and to further limit the amount of lateral movement possible. I preferably employ a link Q of the following construction:—a is a threaded cap for engaging the nipple H on the bell, which has rigidly connected therewith the rod or wire b, bent at c to form a shoulder or stop and then extending upward. At its upper end this wire is bent into a round loop d. e is a separate section of the link which is detachably secured to the lever P, as by the threaded hook f and thumb nut g. h is a bent portion in the member e which forms a stop and at the lower end of said member is a loop or eye i which engages the member b below the stop c. With this construction, the necessary lost motion is provided by the sliding of the member e in relation to the member b to permit of the lever P being returned before the float is lowered to its seat. At the same time, the circular loop d, surrounding the member e, limits the amount of lateral movement permitted between the members b e, so as to prevent any binding of the sleeve M upon the post N.

What I claim as my invention is:—

1. A float formed of a bell of glass closed at one end and open at the other, an externally threaded nipple on the upper portion and integral therewith, an operating connection and an internally threaded cap carried thereby for engagement with said nipple.

2. In a float valve, a float formed of a bell of glass, fashioned to have a closed nipple at one end and threaded at its opposite end and a guide cap engaging said threaded end.

3. In a float valve, a float formed of a bell of glass, having an open neck at its lower end of reduced diameter, an annular valve face of greater diameter above said reduced portion and a cap engaging said reduced portion provided with a guide sleeve.

4. In a float valve, a valve seat having a guide pin projecting upward centrally thereabove, a float valve closed at its upper end and having a guide sleeve at its lower end fitting about said guide pin, a lever for lifting said float, a two-part link connecting said lever to said float, one section thereof provided with an eye or loop surrounding the other section and said other section having an enlarged circular loop surrounding the first-named section, whereby a limited universal movement is permitted.

5. A float valve comprising a hollow glass body having a hollow neck or nipple integral therewith and externally threaded, and a cap correspondingly threaded and engaging said nipple.

6. A float valve comprising a hollow glass body having an open ended neck or nipple and a cap externally engaging said neck or nipple.

7. A float valve comprising a hollow glass body having integral therewith a hollow closed ended nipple at one end and a hollow open nipple at the opposite end, and caps engaging said nipples.

In testimony whereof I affix my signature in presence of two witnesses.

WILLIAM HEAP.

Witnesses:
LIONEL HEAP,
MURIEL V. HEAP.